United States Patent
Tamagawa

(10) Patent No.: US 8,712,636 B2
(45) Date of Patent: Apr. 29, 2014

(54) VEHICLE DRIVE CONTROL SYSTEM

(75) Inventor: Yutaka Tamagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 13/436,997

(22) Filed: Apr. 2, 2012

(65) Prior Publication Data

US 2012/0330485 A1 Dec. 27, 2012

(30) Foreign Application Priority Data

Jun. 24, 2011 (JP) .................................. 2011-140375

(51) Int. Cl.
*G06F 7/00* (2006.01)

(52) U.S. Cl.
USPC .......................................................... 701/36

(58) Field of Classification Search
USPC .............. 701/22, 36; 307/9.1, 10.1; 180/65.1, 180/65.21
See application file for complete search history.

(56) References Cited

U.S. PATENT DOCUMENTS

2005/0247503 A1* 11/2005 Imazu ........................... 180/300

FOREIGN PATENT DOCUMENTS

| JP | 04-091689 | 3/1992 |
|---|---|---|
| JP | 10-164704 | 6/1998 |
| JP | 2003-052188 | 2/2003 |

OTHER PUBLICATIONS

Japanese Office Action for corresponding JP Application No. 2011-140375, Apr. 10, 2013.

* cited by examiner

*Primary Examiner* — Yonel Beaulieu
(74) *Attorney, Agent, or Firm* — Ditthavong Mori & Steiner, P.C.

(57) ABSTRACT

A vehicle drive control system includes a motor, a rotational speed detector, an accelerator opening degree detector, a vehicle speed detector, a torque instruction outputting device, an attenuation filtering device, and a controller. The attenuation filtering device is configured to perform attenuation filtering to a torque instruction to attenuate a natural oscillation frequency component of a torque transmission system of a vehicle and configured to output a filtered torque instruction after the attenuation filtering. The attenuation filtering device is configured to identify an attenuation characteristic of the attenuation filtering if the rotational speed of the motor is smaller than or equal to a predetermined rotational speed and the torque of the motor is higher than or equal to a predetermined torque. The controller is configured to cause the motor to generate a torque corresponding to the filtered torque instruction.

9 Claims, 14 Drawing Sheets

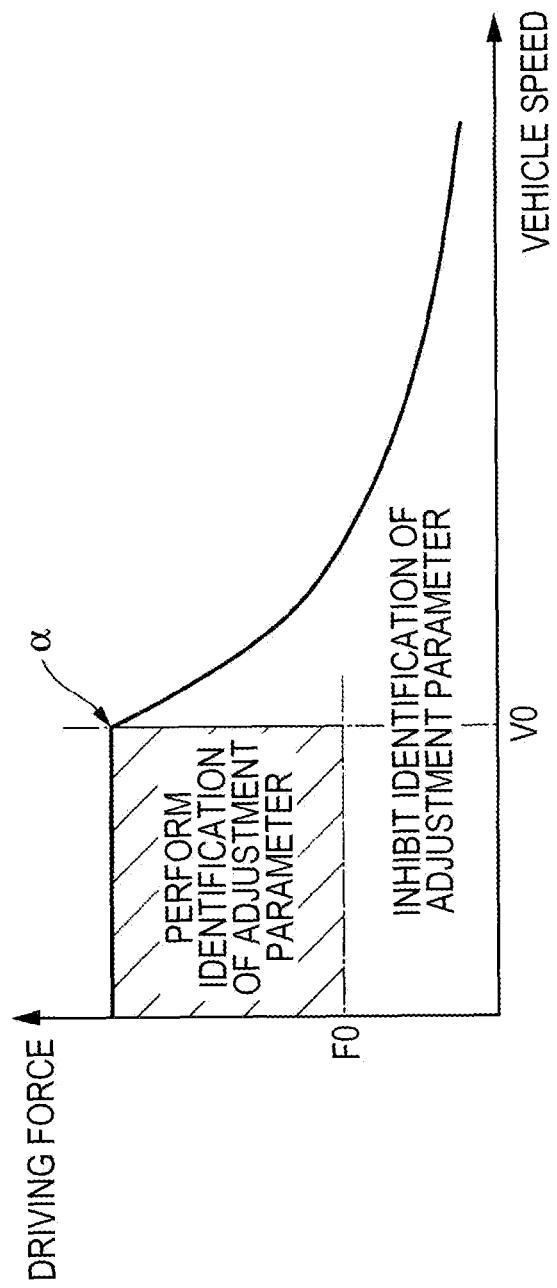

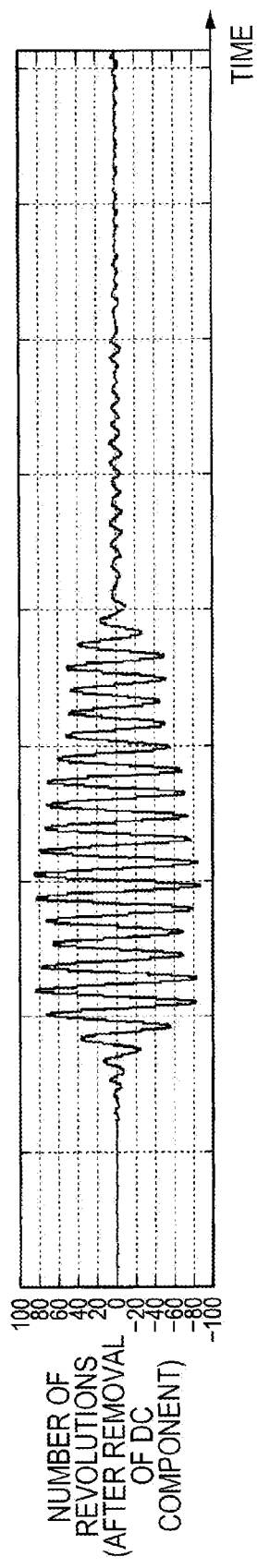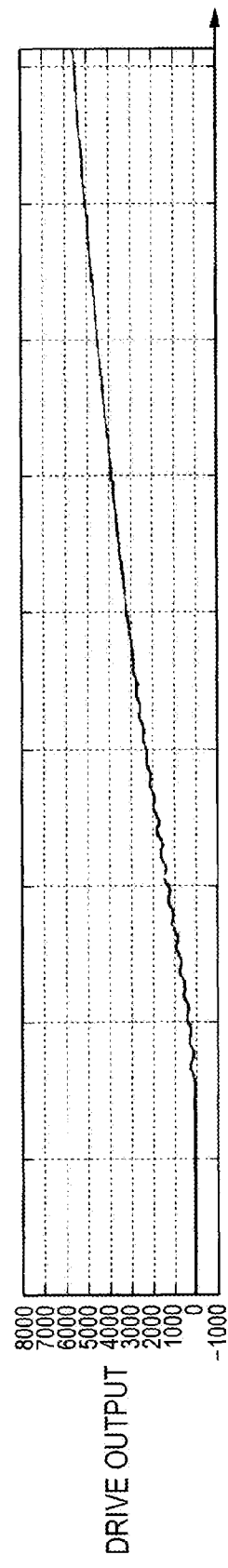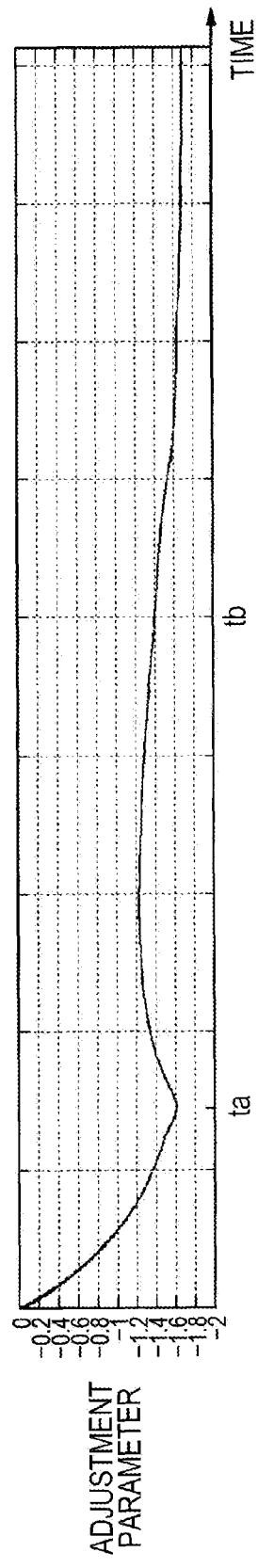

NUMBER OF REVOLUTIONS

NUMBER OF REVOLUTIONS (AFTER REMOVAL OF DC COMPONENT)

ADJUSTMENT PARAMETER

VEHICLE DRIVE CONTROL SYSTEM

CROSS-REFERENCE TO RELATED APPLICATIONS

The present application claims priority under 35 U.S.C. §119 to Japanese Patent Application No. 2011-140375, filed Jun. 24, 2011, entitled "Vehicle Drive Control Apparatus." The contents of this application are incorporated herein by reference in their entirety.

BACKGROUND OF THE INVENTION

1. Field of the Invention

The present invention relates to a vehicle drive control system.

2. Discussion of the Background

Hitherto, for example, speed control apparatuses including filter factor setting units are known (for example, refer to Japanese Unexamined Patent Application Publication No. 4-91689). The filter factor setting units are provided with filters capable of limiting the passing through of frequency components based on adjustable filter factors at the output sides of speed detectors in order to automate adjustment of the filters that suppress mechanical resonance occurring during driving with loads applied and calculate the filter factors for limiting the passing through of the frequency components to be superposed on detected speed values output from the speed detectors to supply the results of the calculation to the filters.

SUMMARY OF THE INVENTION

According to one aspect of the present invention, a vehicle drive control system includes a motor, a rotational speed detector, an accelerator opening degree detector, a vehicle speed detector, a torque instruction outputting device, an attenuation filtering device, and a controller. The motor is configured to generate a running driving force of a vehicle. The rotational speed detector is configured to detect rotational speed of the motor. The accelerator opening degree detector is configured to detect an opening degree of an accelerator of the vehicle. The vehicle speed detector is configured to detect a speed of the vehicle. The torque instruction outputting device is configured to output a torque instruction for the motor in accordance with a required driving force based on the accelerator opening degree detected by the accelerator opening degree detector and the vehicle speed detected by the vehicle speed detector. The attenuation filtering device is configured to perform attenuation filtering to the torque instruction to attenuate a natural oscillation frequency component of a torque transmission system of the vehicle and configured to output a filtered torque instruction after the attenuation filtering. The attenuation filtering device is configured to identify an attenuation characteristic of the attenuation filtering if the rotational speed of the motor is smaller than or equal to a predetermined rotational speed and the torque of the motor is higher than or equal to a predetermined torque. The controller is configured to cause the motor to generate a torque corresponding to the filtered torque instruction.

According to another aspect of the present invention, a vehicle drive control system includes generating means, rotational speed detecting means, accelerator opening degree detecting means, vehicle speed detecting means, torque instruction outputting means, attenuation filtering means, and controlling means. The generating means is for generating a running driving force of a vehicle. The rotational speed detecting means is for detecting rotational speed of the generating means. The accelerator opening degree detecting means is for detecting an opening degree of an accelerator of the vehicle. The vehicle speed detecting means is for detecting a speed of the vehicle. The torque instruction outputting means is for outputting a torque instruction for the generating means in accordance with a required driving force based on the accelerator opening degree detected by the accelerator opening degree detecting means and the vehicle speed detected by the vehicle speed detecting means. The attenuation filtering means is for performing attenuation filtering to the torque instruction to attenuate a natural oscillation frequency component of a torque transmission system of the vehicle and for outputting a filtered torque instruction after the attenuation filtering. The attenuation filtering means is for identifying an attenuation characteristic of the attenuation filtering if the rotational speed of the generating means is smaller than or equal to a predetermined rotational speed and the torque of the generating means is higher than or equal to a predetermined torque. The controlling means is for causing the generating means to generate a torque corresponding to the filtered torque instruction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 illustrates an example of an area where identification of the adjustment parameter is performed within an operable range of a vehicle speed and a driving force of the hybrid vehicle according to the embodiment;

FIG. 10A illustrates an example of a signal composed of an oscillation component indicating the number of revolutions of a drive motor, output from a DC component removal filter, FIG. 10B illustrates an example of a drive output from the drive motor, and FIG. 10C illustrates an example of the adjustment parameter output from a parameter identifier in the vehicle drive control apparatus according to the embodiment;

DESCRIPTION OF THE EMBODIMENTS

Figure 1:
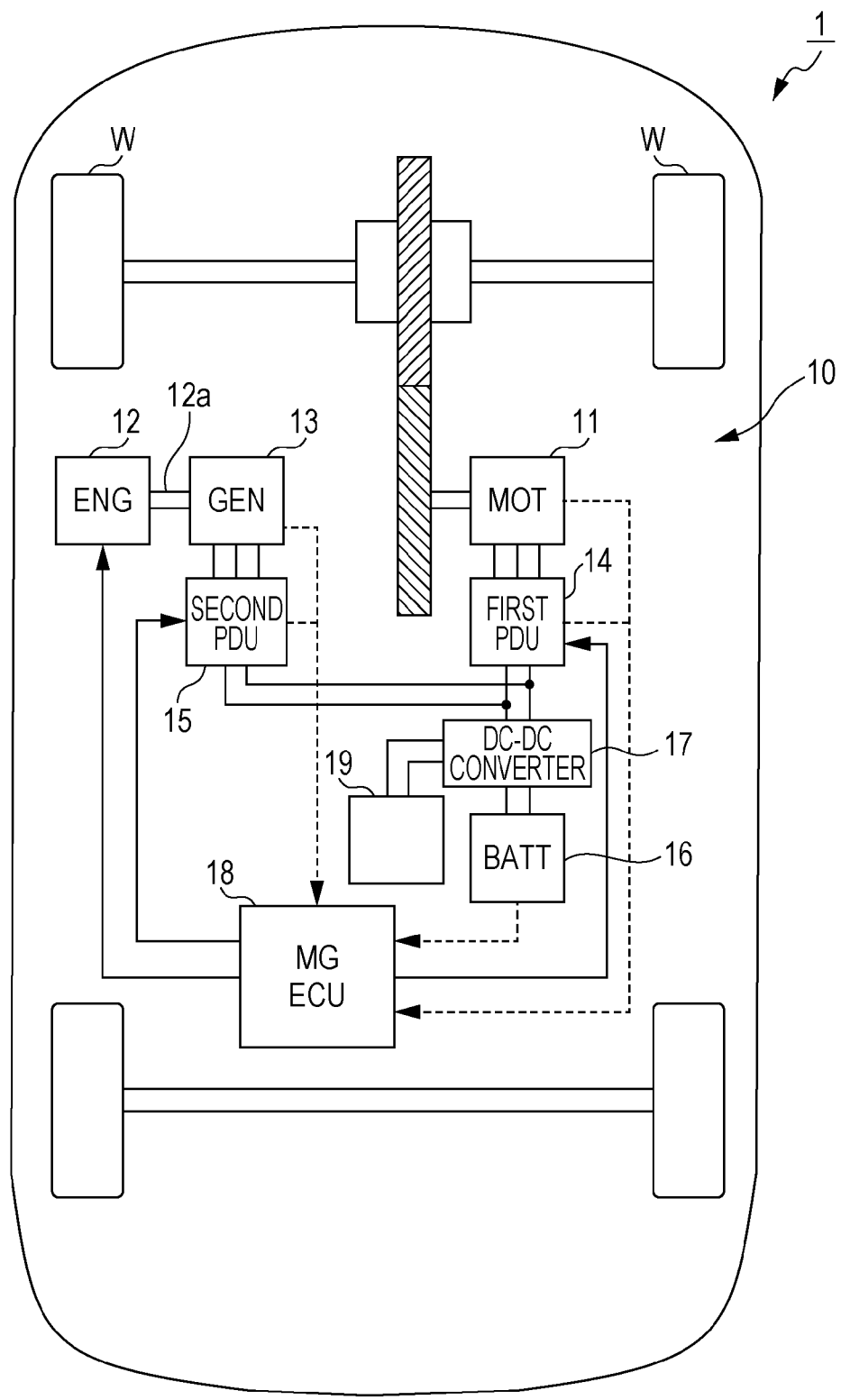
FIG. 1 illustrates an example of the configuration of a vehicle drive control apparatus according to an embodiment mounted in a hybrid vehicle.

The embodiments will now be described with reference to the accompanying drawings, wherein like reference numerals designate corresponding or identical elements throughout the various drawings.

FIG. 1 illustrates an example of the configuration of a vehicle drive control system 10 according to the present embodiment mounted in a hybrid vehicle 1. The hybrid vehicle 1 is, for example, a series hybrid vehicle in which a drive motor (MOT) 11 is connected to driving wheels W and a power generation motor (GEN) 13 is connected to a crank shaft 12a of an internal combustion engine (ENG) 12.

Each of the drive motor 11 and the power generation motor 13 is, for example, a three-phase direct current (DC) brushless motor. The drive motor 11 is connected to a first power drive unit (PDU) 14 controlling the drive motor 11, and the power generation motor 13 is connected to a second PDU 15 controlling the power generation motor 13. Each of the first PDU 14 and the second PDU 15 includes a pulse width modulation (PWM) inverter provided with a bridge circuit in which multiple switching elements, such as transistors, are bridge-connected to each other.

The first PDU 14 and the second PDU 15 are connected to a DC-DC converter 17. The DC-DC converter 17 is connected to a high-voltage battery 19 of, for example, a lithium-ion (Li-ion) type. For example, while the drive motor 11 is driven, the first PDU 14 converts a DC power supplied from the high-voltage battery 19 or the second PDU 15 for the power generation motor 13 into an alternating current (AC) power to supply the AC power to the drive motor 11. For example, when the power generation motor 13 generates electric power with the power of the internal combustion engine 12, the second PDU 15 converts an AC power output from the power generation motor 13 into a DC power to charge the high-voltage battery 19 or supply the power to the first PDU 14 for the drive motor 11.

For example, when a driving force is transmitted from the side of the driving wheels W to the drive motor 11, during deceleration of the hybrid vehicle 1, the drive motor 11 functions as a power generator to generate a regenerative brake force and recovers the kinetic energy of the vehicle body as an electrical energy. During the power generation by the drive motor 11, the first PDU 14 converts an AC (regenerative) power output from the drive motor 11 into a DC power to charge the high-voltage battery 19.

A low-voltage battery (BATT) 16 for driving electrical loads composed of various auxiliary machinery is connected to the DC-DC converter 17. The DC-DC converter 17 is connected to the first PDU 14, the second PDU 15, and the high-voltage battery 19. The DC-DC converter 17 is capable of decreasing the voltage between terminals of the high-voltage battery 19 or the voltage between terminals of each of the first PDU 14 and the second PDU 15 to a certain voltage to charge the low-voltage battery 16. For example, when the state of charge (SOC) of the high-voltage battery 19 is decreased, the voltage between terminals of the low-voltage battery 16 may be increased to charge the high-voltage battery 19.

The vehicle drive control system 10 further includes a management electronic control unit (MGECU) 18 that integrally controls the hybrid vehicle 1, as an ECU composed of an electronic circuit, such as a central processing unit (CPU).

Figure 2:
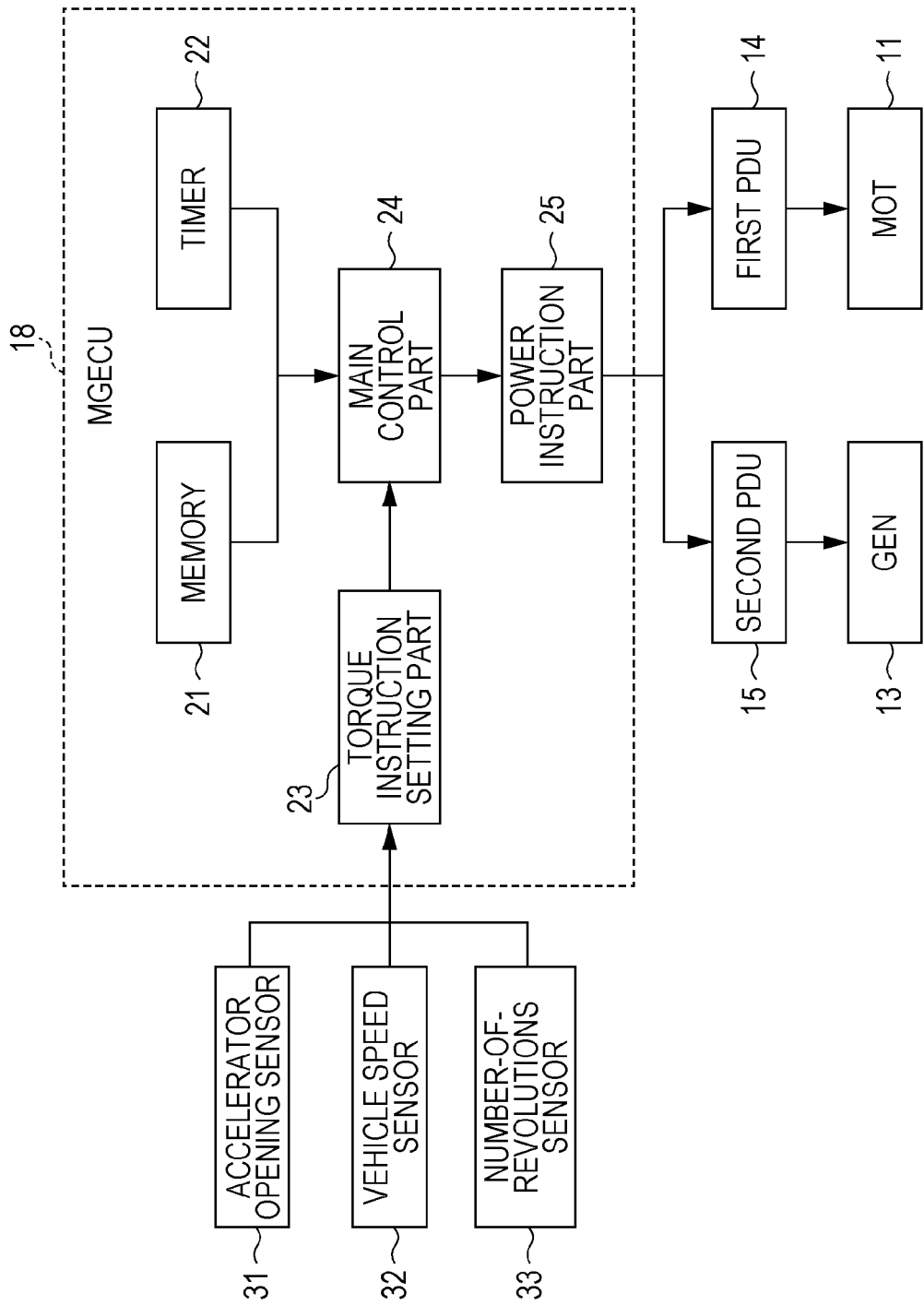
FIG. 2 is a block diagram illustrating an example of the configuration of an MGECU in the vehicle drive control apparatus according to the embodiment.

FIG. 2 is a block diagram illustrating an example of the configuration of the MGECU 18. Referring to FIG. 2, the MGECU 18 includes a memory 21, a timer 22, a torque instruction setting part 23, a main control part 24, and a power instruction part 25. For example, a detection signal output from an accelerator opening sensor 31 (accelerator opening degree detector) that detects the amount of stroke (accelerator opening degree) of an accelerator pedal caused by depression of the accelerator pedal by a driver of the hybrid vehicle 1, a detection signal output from a vehicle speed sensor 32 (vehicle speed detector) that detects the speed (vehicle speed) of the hybrid vehicle 1, and a detection signal output from a number-of-revolutions sensor 33 (rotational speed detector) that detects the number of revolutions of the drive motor 11 are supplied to the MGECU 18.

The torque instruction setting part 23 outputs a torque instruction for the drive motor 11 on the basis of a required driving force based on the accelerator opening and the vehicle speed, as described below.

The main control part 24 performs feedback control of, for example, a current passing through the drive motor 11 and the power generation motor 13 on the basis of the torque instruction output from the torque instruction setting part 23 while referring to a variety of data stored in the memory 21 and the time measured by the timer 22 to output an instruction signal for instructing the operation of each of the drive motor 11 and the power generation motor 13.

The power instruction part 25 outputs a control signal for controlling a power conversion operation of each of the first PDU 14 and the second PDU 15 in accordance with the instruction signal output from the main control part 24 to control the driving and the power generation in drive motor 11 and the power generation in the power generation motor 13 with the power from the internal combustion engine 12.

Figure 3:
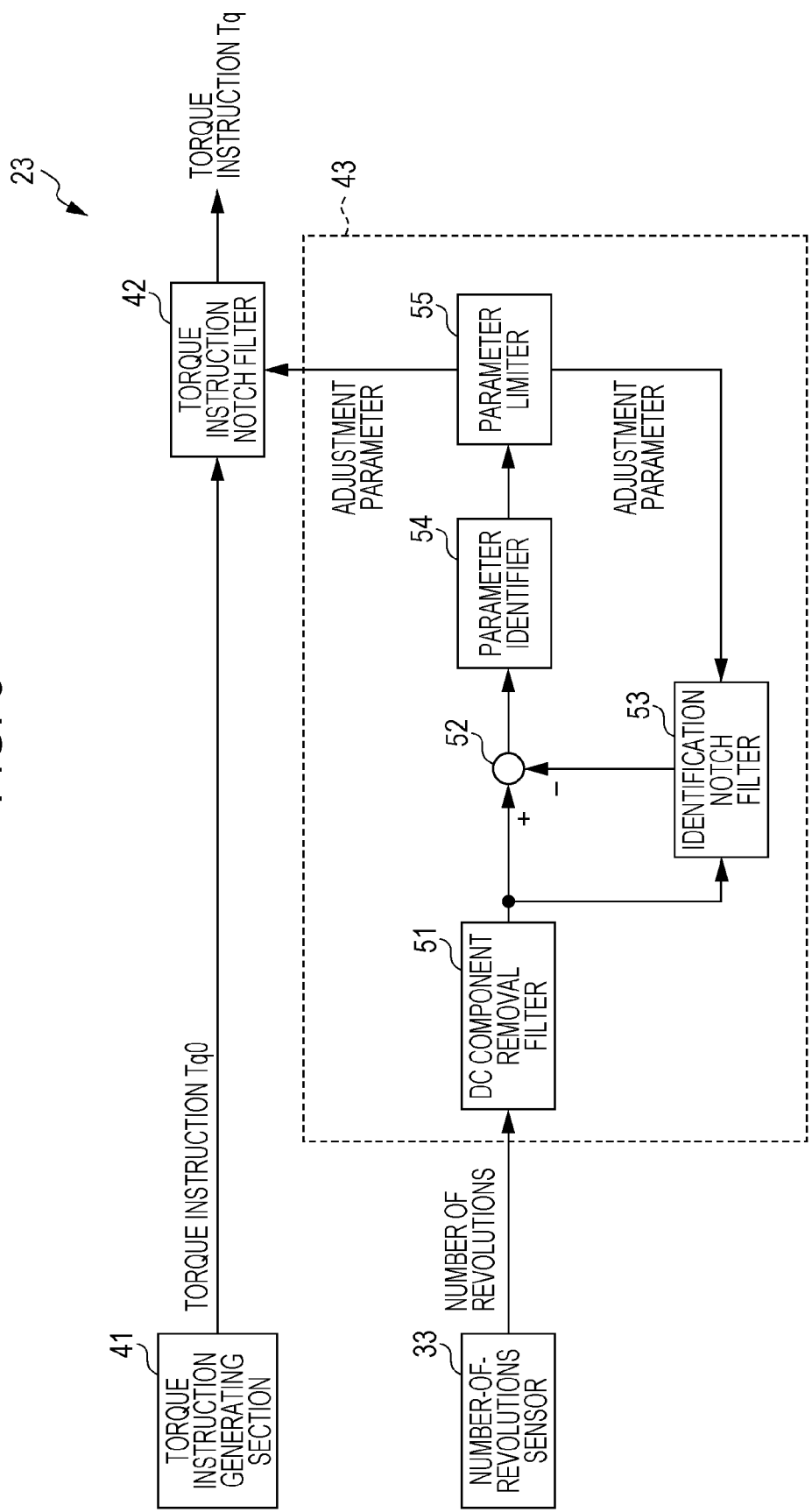
FIG. 3 is a block diagram illustrating an example of the configuration of a torque instruction setting part in the vehicle drive control apparatus according to the embodiment.

FIG. 3 is a block diagram illustrating an example of the configuration of the torque instruction setting part 23. Referring to FIG. 3, the torque instruction setting part 23 includes a torque instruction generating section 41, a torque instruction notch filter 42, and an adjustment parameter calculating section 43.

Figure 4:
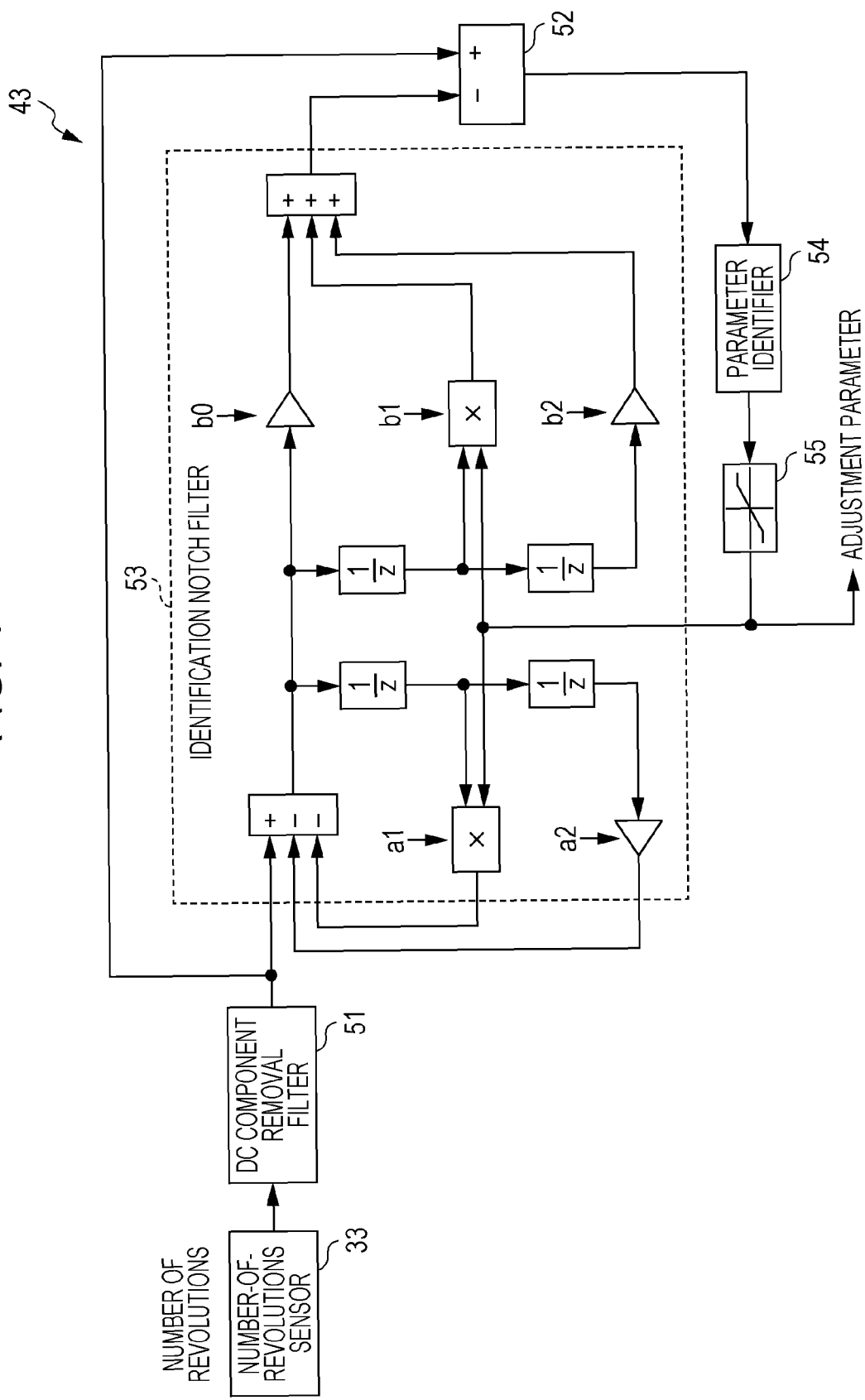
FIG. 4 illustrates an example of the configuration of an adjustment parameter calculating section in the vehicle drive control apparatus according to the embodiment.

FIG. 4 illustrates an example of the configuration of the adjustment parameter calculating section 43. Referring to FIG. 4, the adjustment parameter calculating section 43 includes a DC component removal filter 51, a difference calculator 52, an identification notch filter 53, a parameter identifier 54, and a parameter limiter 55.

For example, the torque instruction generating section 41 calculates a driving force required for the drive motor 11 on the basis of the accelerator opening and the vehicle speed and calculates a torque instruction Tq0 for instructing the drive motor 11 to output a torque corresponding to the required driving force to output the torque instruction Tq0.

The torque instruction notch filter 42 performs attenuation filtering to the torque instruction Tq0 output from the torque instruction generating section 41 to output a torque instruction Tq after the attenuation filtering. The torque instruction notch filter 42 adjusts the attenuation characteristics of the attenuation filtering in accordance with an adjustment parameter output from the adjustment parameter calculating section 43.

Figure 5:
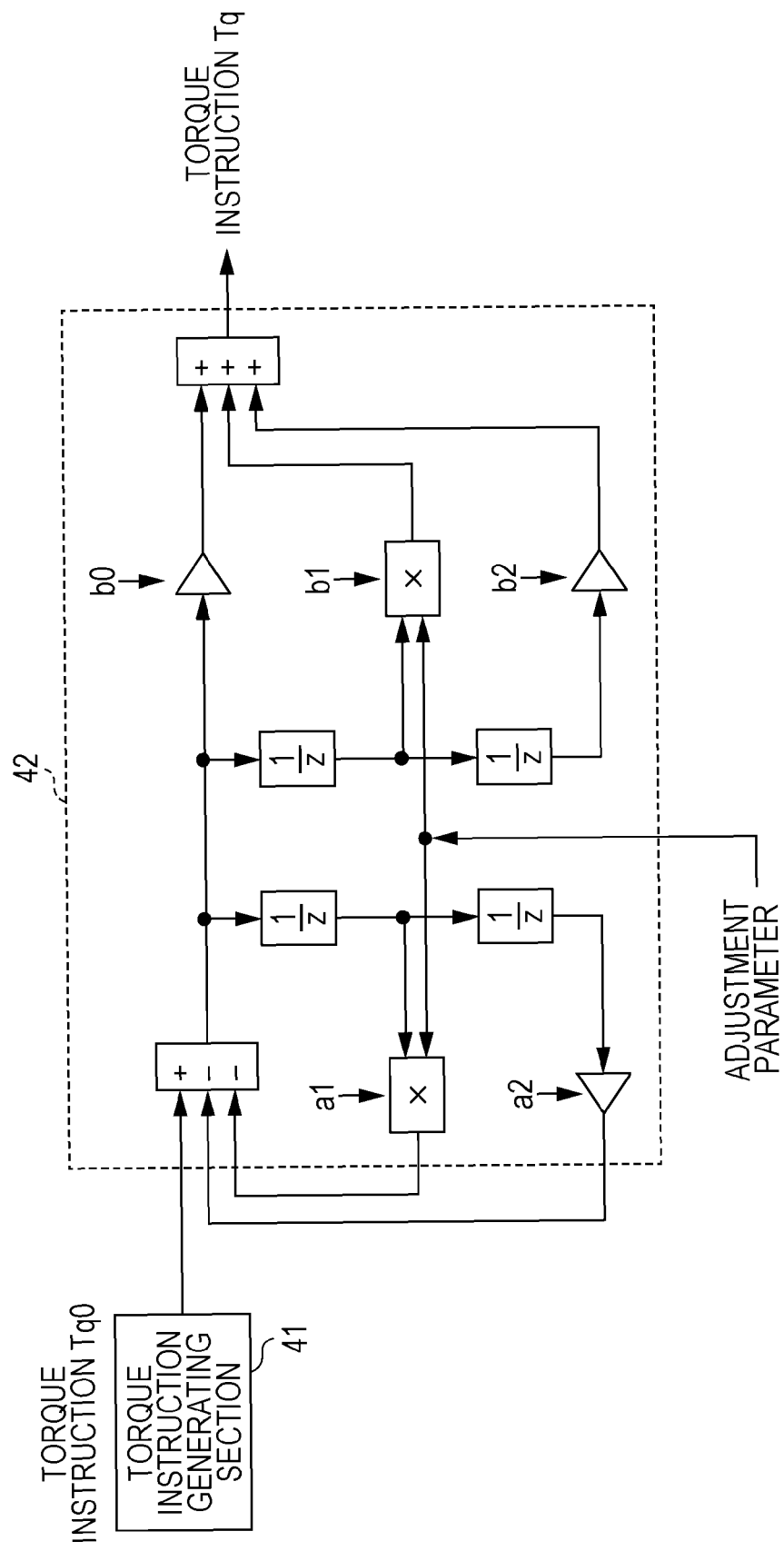
FIG. 5 illustrates an example of the configuration of a torque instruction notch filter in the vehicle drive control apparatus according to the embodiment.

FIG. 5 illustrates an example of the configuration of the torque instruction notch filter 42. The torque instruction notch filter 42 is a so-called second-order Direct Form II infinite impulse response (IIR) filter, as illustrated in FIG. 5. Specifically, the torque instruction notch filter 42 adjusts filter factors a1 and b1 concerning the frequency characteristics of the attenuation filtering, among filter factors a1 and a2 of a feedback part and filter factors b0, b1, and b2 of a feedforward part, in accordance with the adjustment parameter output from the adjustment parameter calculating section 43.

Figure 6A:
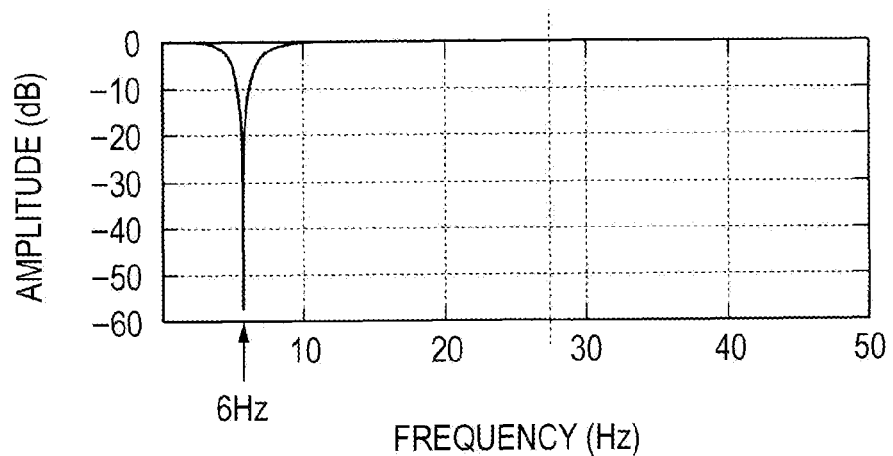
FIG. 6A illustrates an exemplary attenuation characteristic of a torque instruction notch filter.
Figure 6B:
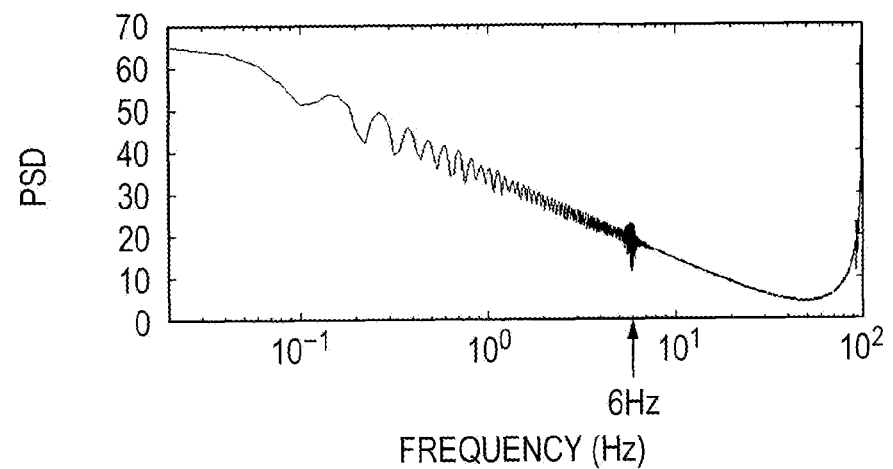
FIG. 6B illustrates an exemplary waveform of a torque instruction.
Figure 6C:
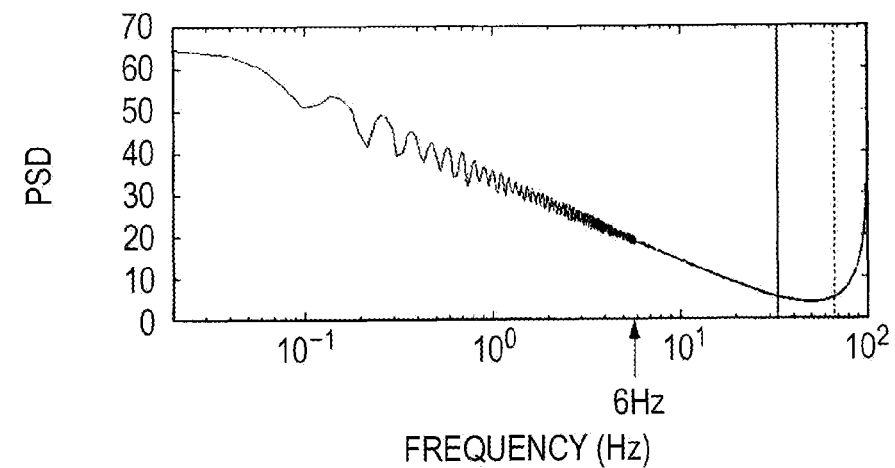
FIG. 6C illustrates an exemplary waveform of a torque instruction after attenuation filtering in the vehicle drive control apparatus according to the embodiment.

For example, the attenuation filtering of the waveform of a torque instruction having oscillation frequency components around 6 Hz, illustrated in FIG. 6B, performed by the torque instruction notch filter 42 having the attenuation characteristics to attenuate frequencies around 6 Hz, illustrated in FIG. 6A, results in the waveform of a torque instruction from which the oscillation frequency components around 6 Hz are removed, illustrated in FIG. 6C.

The adjustment parameter calculating section 43 calculates an adjustment parameter for the torque instruction notch filter 42 on the basis of the number of revolutions of the drive motor 11. In the adjustment parameter calculating section 43, the DC component removal filter 51 is, for example, a high-pass filter. The DC component removal filter 51 removes a DC component from the detection signal indicating the number of revolutions of the drive motor 11, output from the number-of-revolutions sensor 33, to output a signal composed of the oscillation component.

The difference calculator 52 subtracts a signal output from the identification notch filter 53 from the signal output from the DC component removal filter 51 (that is, the signal composed of the oscillation component) to calculate the difference between the signals and outputs the difference signal.

The identification notch filter 53 performs the attenuation filtering to the signal output from the DC component removal filter 51 (that is, the signal composed of the oscillation component) to output a signal after the attenuation filtering. The identification notch filter 53 adjusts the attenuation characteristics of the attenuation filtering in accordance with an adjustment parameter output from the parameter limiter 55 (that is, the adjustment parameter that is equal to the adjustment parameter supplied to the torque instruction notch filter 42).

The identification notch filter 53 has the same configuration as that of the torque instruction notch filter 42, as illustrated in FIG. 4, and is a so-called second-order Direct Form II IIR filter. Specifically, the identification notch filter 53 adjusts the filter factors a1 and b1 concerning the frequency characteristics of the attenuation filtering, among the filter factors a1 and a2 of the feedback part and the filter factors b0, b1, and b2 of the feedforward part, in accordance with the adjustment parameter output from the parameter limiter 55.

In other words, the signal output from the identification notch filter 53 results from the attenuation of the oscillation frequency component having the same oscillation frequency as that of the natural oscillation frequency component of a torque transmission system from the signal output from the DC component removal filter 51 (that is, the signal composed of the oscillation component). In accordance with the above attenuation, the difference calculator 52 extracts the oscillation frequency component having the same oscillation frequency as that of the natural oscillation frequency component of the torque transmission system from the signal output from the DC component removal filter 51 (that is, the signal composed of the oscillation component). As a result, the signal output from the difference calculator 52 is composed of the oscillation frequency component having the number of revolutions corresponding to the same oscillation frequency as that of the natural oscillation frequency component of the torque transmission system.

The parameter identifier 54 is a so-called adaptive filter. For example, an adaptive filter using a least mean square (LMS) adaptive algorithm modifies and updates a parameter w(n) so as to minimize an instantaneous square error.

In general, a parameter update equation (that is, a parameter w(n+1) after modification) in the LMS is described as follows:

$$w(n+1) = w(n) + \mu x(n)e(n) \qquad (1)$$

where x(n) denotes an input signal, e(n) denotes the difference between the input signal and an output signal, and $\mu$ denotes a step-size parameter used to adjust the adaptation speed.

The parameter identifier 54 calculates the parameter w(n+1) after modification by using the above equation (1) in which the signal output from the difference calculator 52 is used as the input signal x(n) and outputs the parameter w(n+1) after modification as the adjustment parameter for adjusting the attenuation characteristics of the torque instruction notch filter 42 and the identification notch filter 53. The parameter identifier 54 identifies the adjustment parameter if the number of revolutions of the drive motor 11 is smaller than or equal to a predetermined number of revolutions and the torque of the drive motor 11 is higher than or equal to a predetermined torque.

The parameter limiter 55 limits the adjustment parameter output from the parameter identifier 54 to a value within a predetermined range corresponding to a desired oscillation frequency band of the torque transmission system.

For example, the parameter limiter 55 sets the frequency band of the torque transmission system, which is to be attenuated by the attenuation filtering in the torque instruction notch filter 42 and the identification notch filter 53 in consideration of, for example, the individual difference of the hybrid vehicle 1 in advance. Then, the parameter limiter 55 sets a predetermined range of the filter factors corresponding to the frequency band (that is, the filter factors a1 and b1 concerning the frequency characteristics of the attenuation filtering) as a limited range. Then, the parameter limiter 55 sets a predetermined range of the adjustment parameter, within which the filter factors adjusted by the adjustment parameter (that is, the filter factors a1 and b1 concerning the frequency characteristics of the attenuation filtering) each have a value within the limited range.

An operation of the vehicle drive control system 10 according to the present embodiment having the above configuration will now be described.

Figure 7:
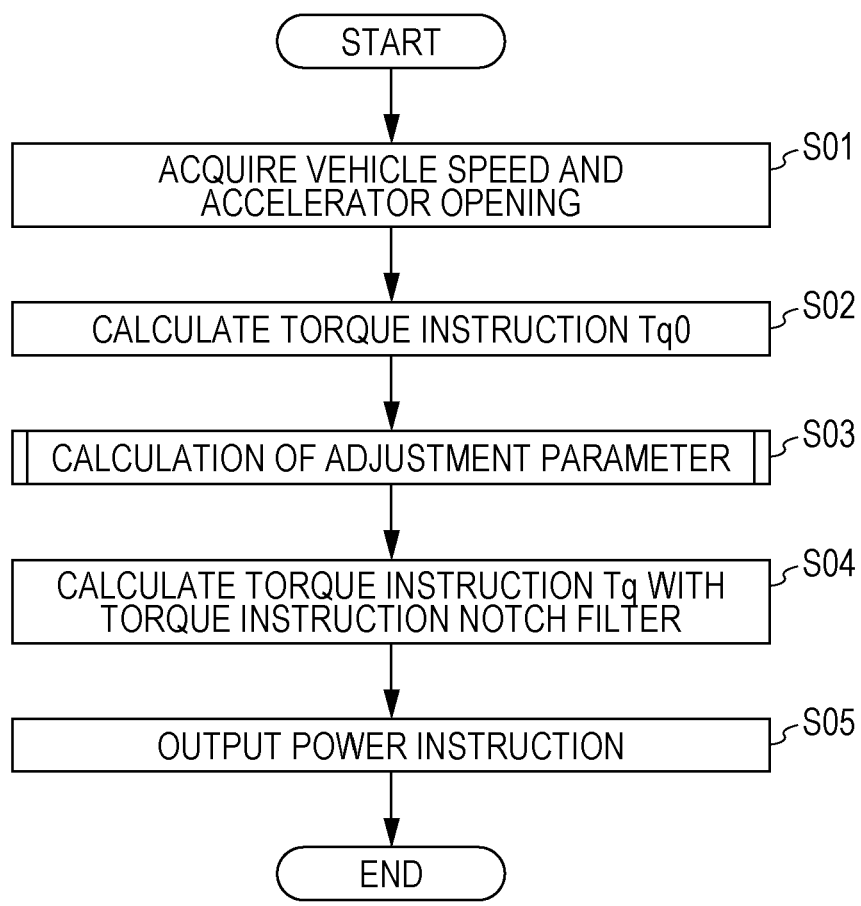
FIG. 7 is a flow chart illustrating an example of an operation of the vehicle drive control apparatus according to the embodiment.

FIG. 7 is a flow chart illustrating an example of the operation of the vehicle drive control system 10. Referring to FIG.

7, in Step S01, the vehicle drive control system 10 acquires the vehicle speed and the accelerator opening of the hybrid vehicle 1. In Step S02, the vehicle drive control system 10 calculates a driving force required for the drive motor 11 on the basis of the accelerator opening and the vehicle speed to calculate the torque instruction Tq0 for instructing the drive motor 11 to output the torque corresponding to the required driving force.

In Step S03, the vehicle drive control system 10 executes a process of calculating the adjustment parameter described below. In Step S04, the vehicle drive control system 10 performs the attenuation filtering to the torque instruction Tq0 with the torque instruction notch filter 42 having the attenuation characteristics adjusted in accordance with the adjustment parameter to calculate the torque instruction Tq after the attenuation filtering.

In Step S05, the vehicle drive control system 10 outputs a control signal for controlling the driving and the power generation of the drive motor 11 by the power conversion operation of the first PDU 14 in response to the torque instruction Tq. Then, the operation is terminated.

Figure 8:
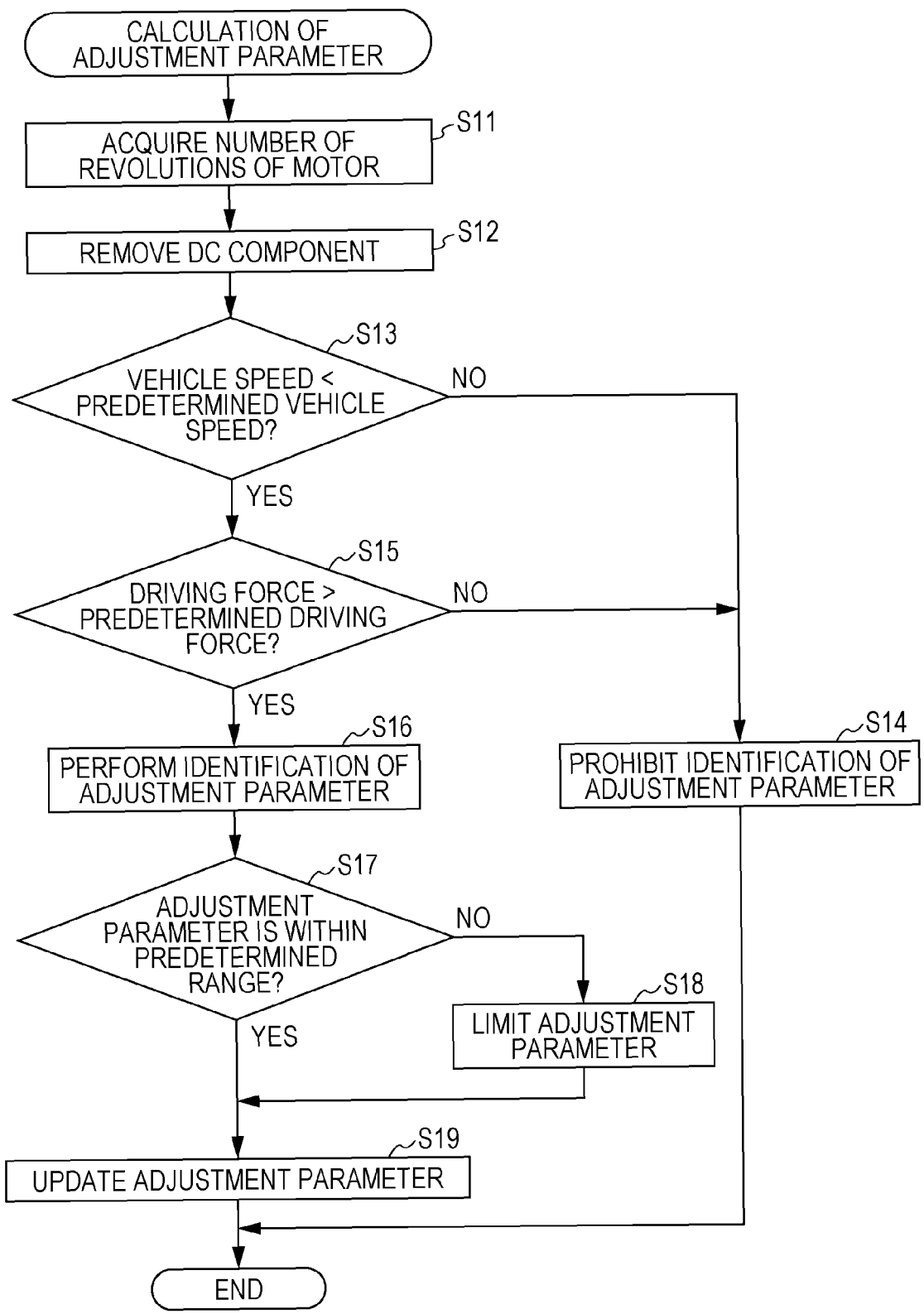
FIG. 8 is a flow chart illustrating an example of a process of calculating an adjustment parameter in FIG. 7.

FIG. 8 is a flow chart illustrating an example of the process of calculating the adjustment parameter in Step S03 in detail. Referring to FIG. 8, in Step S11, the vehicle drive control system 10 acquires the number of revolutions of the drive motor 11. In Step S12, the vehicle drive control system 10 removes the DC component from the number of revolutions of the drive motor 11 to extract a signal composed of the oscillation component.

In Step S13, the vehicle drive control system 10 determines whether the vehicle speed of the hybrid vehicle 1 is lower than a predetermined vehicle speed V0 (for example, 40 km/h) illustrated in FIG. 9. If the determination is affirmative (YES in Step S13), the process goes to Step S15. If the determination is negative (NO in Step S13), the process goes to Step S14. In Step S14, the vehicle drive control system 10 prohibits the identification of the adjustment parameter. Then, the process is terminated.

In Step S15, the vehicle drive control system 10 determines whether the driving force of the hybrid vehicle 1 is larger than a predetermined driving force F0 (for example, 2,000 N) illustrated in FIG. 9. If the determination is affirmative (YES in Step S15), the process goes to Step S16. If the determination is negative (NO in Step S15), the process goes to Step S14 described above.

In Step S16, the vehicle drive control system 10 performs the identification of the adjustment parameter on the basis of the signal composed of the oscillation component extracted from the number of revolutions of the drive motor 11. The identification of the adjustment parameter is performed in a driving state in which the vehicle speed is lower than the predetermined vehicle speed V0 and the driving force is larger than the predetermined driving force F0 within an operable range α of the vehicle speed and the driving force of the hybrid vehicle 1, illustrated in FIG. 9.

In Step S17, the vehicle drive control system 10 determines whether the adjustment parameter has a value within a predetermined range. If the determination is affirmative (YES in Step S17), the process goes to Step S19. If the determination is negative (NO in Step S17), the process goes to Step S18. In Step S18, the vehicle drive control system 10 limits the adjustment parameter to a lower limit value or an upper limit value of the predetermined range. Then, the process goes to Step S19. In Step S19, the vehicle drive control system 10 updates the adjustment parameter. Then, the process is terminated.

Figure 11A:
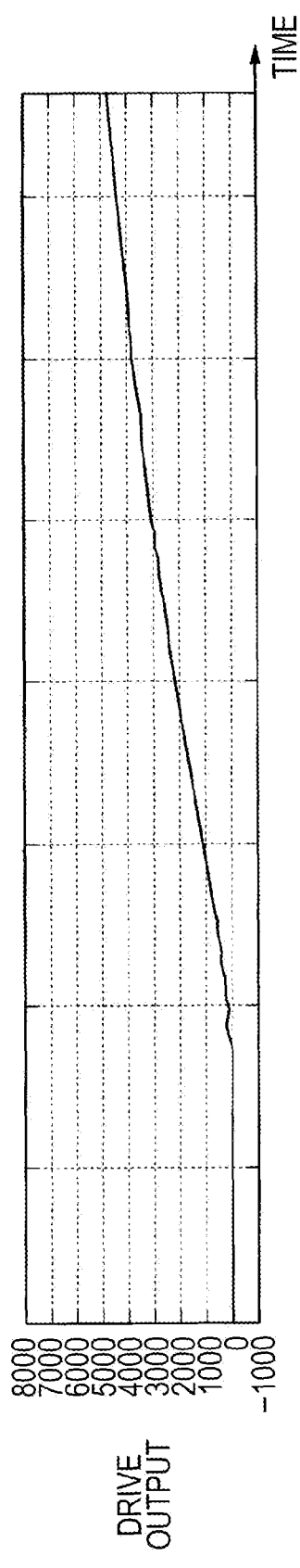
FIG. 11A illustrates an example of the drive output from the drive motor and FIG. 11B illustrates an example of the adjustment parameter output from the parameter identifier in the vehicle drive control apparatus according to the embodiment.
Figure 11B:
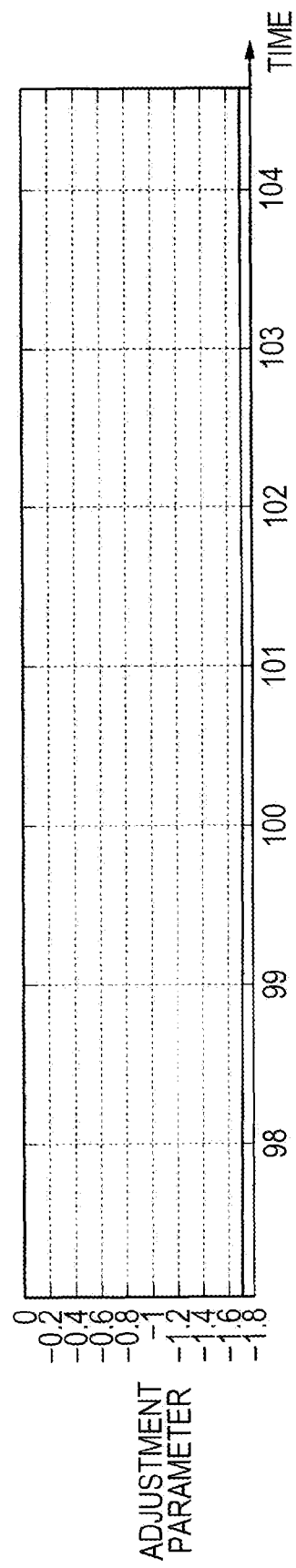

For example, as illustrated in FIG. 10A to FIG. 10C, even if a drive output of the drive motor 11 and the number of revolutions thereof are varied due to the natural oscillation of the torque transmission system along with an increase in the drive output of the drive motor 11 after a time ta, the identification of the adjustment parameter allows the attenuation characteristics of the attenuation filtering to be adjusted to attenuate the variation in the number of revolutions and the oscillation component of the drive output after a time tb. For example, as illustrated in FIG. 11A and FIG. 11B, after the identification of the adjustment parameter for the torque transmission system causes the adjustment parameter to converge on an appropriate value, the variation due to the natural oscillation of the torque transmission system is prevented from occurring even if the drive output of the drive motor 11 is increased.

Figure 12A:
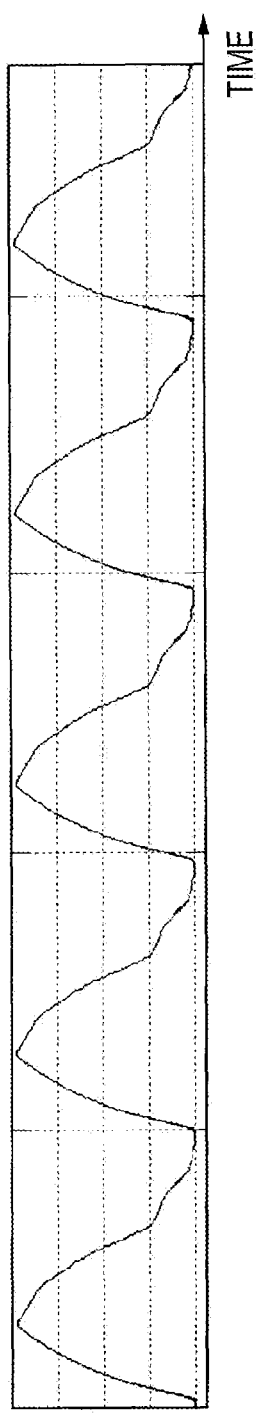
FIG. 12A illustrates an example of the number of revolutions of the drive motor.
Figure 12B:
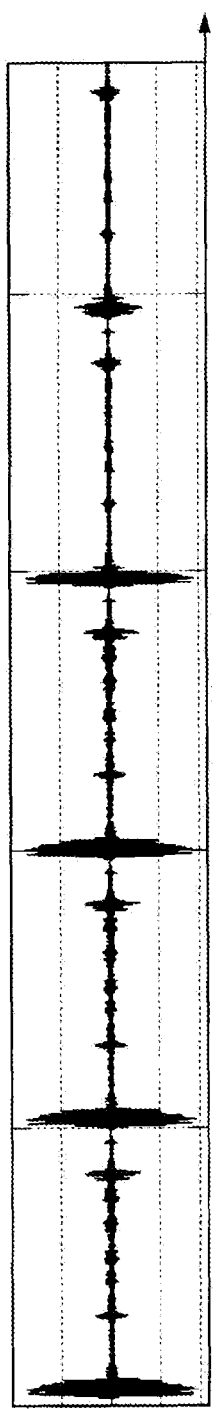
FIG. 12B illustrates an example of the signal composed of the oscillation component indicating the number of revolutions of the drive motor, output from the DC component removal filter.
Figure 12C:
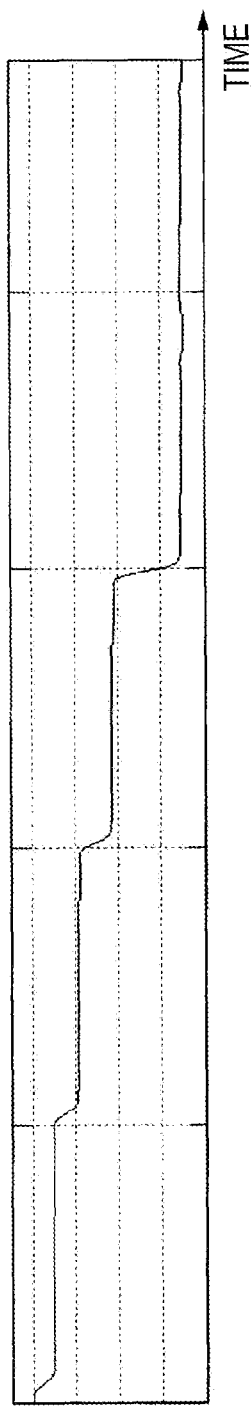
FIG. 12C illustrates an example of the adjustment parameter output from the parameter identifier in the vehicle drive control apparatus according to the embodiment.

For example, as illustrated in FIG. 12A to FIG. 12C, the identification of the adjustment parameter may be performed for every time when a state occurs in which the natural oscillation (that is, the resonance) of the torque transmission system is likely to be induced when the number of revolutions of the drive motor 11 is increased, that is, during the acceleration in which the vehicle speed of the hybrid vehicle 1 is lower than the predetermined vehicle speed V0 and the driving force thereof is larger than the predetermined driving force F0. The repetition of the modification and the update of the adjustment parameter allows the variation due to the natural oscillation of the torque transmission system, occurring in the drive output from the drive motor 11 and the number of revolutions thereof, to be gradually reduced.

As described above, according to the vehicle drive control system 10 of the present embodiment, the attenuation characteristics of the attenuation filtering by the torque instruction notch filter 42 are identified only when the number of revolutions of the drive motor 11 is smaller than or equal to a predetermined number of revolutions and the torque of the drive motor 11 is higher than or equal to a predetermined torque in the state in which the natural oscillation of the torque transmission system of the hybrid vehicle 1 is likely to be induced. Accordingly, it is possible to rapidly identify appropriate attenuation characteristics. As a result, even if the natural oscillation frequency (for example, within a range from five Hz to six Hz) of the torque transmission system is varied due to, for example, aging of the hybrid vehicle 1, the attenuation characteristics of the torque instruction notch filter 42 can be caused to appropriately follow the variation to suppress the mechanical resonance of the hybrid vehicle 1. Accordingly, it is possible to drive the drive motor 11 without providing a feeling of discomfort to occupants of the hybrid vehicle 1.

In addition, the natural oscillation frequency component attenuated in the torque instruction Tq0 output from the torque instruction generating section 41 has the same oscillation frequency as that of the oscillation frequency component of the variation in the number of revolutions due to the variation in the torque. Accordingly, the adjustment of the attenuation characteristics of the attenuation filtering by the torque instruction notch filter 42 to the torque instruction Tq0 by using the adjustment parameter calculated in adaptive processing based on the variation in the number of revolutions allows the natural oscillation frequency component inducing the mechanical resonance to be appropriately attenuated from the torque instruction Tq to suppress the mechanical resonance of the hybrid vehicle 1.

Furthermore, the frequency band to be attenuated in the attenuation filtering by the torque instruction notch filter 42 can be set in consideration of, for example, the individual difference of the hybrid vehicle 1 in advance and a predetermined range of the filter factors corresponding to this frequency band (that is, the filter factors a1 and b1 concerning the frequency characteristics of the attenuation filtering) can be set as the limited range to, for example, prevent the frequency that is attenuated from being inappropriately shifted in the attenuation filtering and to prevent inappropriate divergence from occurring in the attenuation filtering.

Furthermore, even if brake operations and/or accelerator operations that are close to the natural oscillation frequency of the torque transmission system are performed in a state in which the resonance of the torque transmission system does not significantly appear normally when the number of revolutions of the drive motor 11 is largely varied, for example, as in rapid slip or rapid deceleration of the hybrid vehicle 1 or pumping brake in the hybrid vehicle 1, the stop of the identification of the attenuation characteristics prevents the attenuation characteristics from being inappropriately set so as to attenuate the frequency components of such operations.

The hybrid vehicle 1 is not limited to the series hybrid vehicle in the embodiment described above, the hybrid vehicle 1 may be, for example, a hybrid vehicle having both the series function and a parallel function. The vehicle drive control system 10 is not limitedly mounted in the hybrid vehicle, the vehicle drive control system 10 may be mounted in, for example, an electrically driven vehicle in which the drive motor (MOT) 11 is connected to the driving wheels W.

Figure 13:
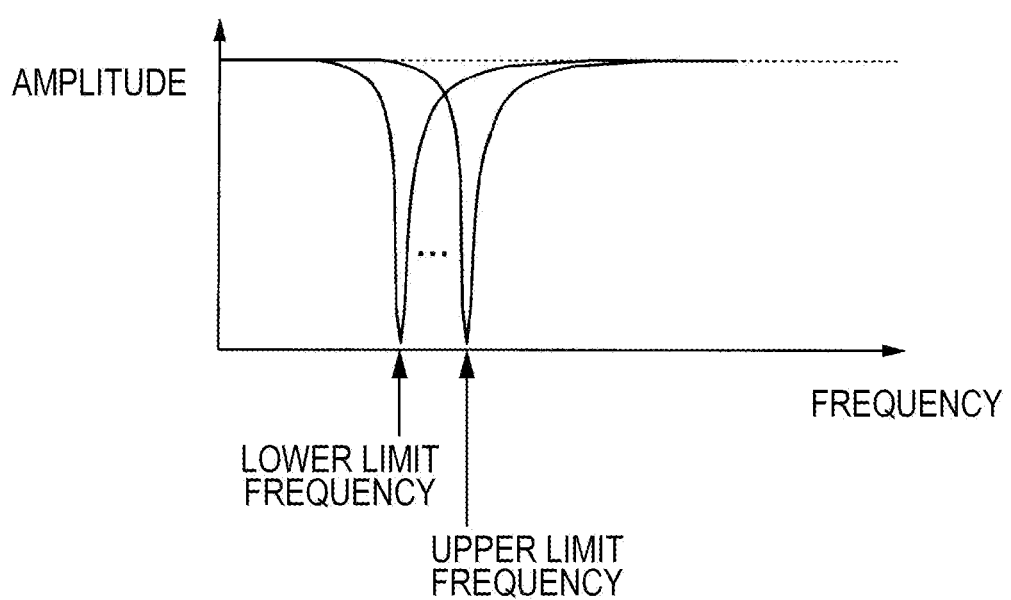
FIG. 13 is a graph illustrating an example of attenuation characteristics of multiple torque instruction notch filters in the torque instruction setting part in the vehicle drive control apparatus according to the embodiment.

Although the torque instruction setting part 23 includes one torque instruction notch filter 42 in the embodiment described above, the torque instruction setting part 23 is not limited to this configuration. For example, multiple torque instruction notch filters 42 having different attenuation characteristics may be connected in series (may be cascaded) to each other in the torque instruction setting part 23. In this case, for example, as illustrated in a graph in FIG. 13, a frequency band from a certain lower limit frequency to a certain upper limit frequency, set in advance in accordance with the individual difference of the hybrid vehicle 1, may be set as an attenuation target area and the multiple torque instruction notch filters 42 having attenuation characteristics in which different appropriate frequencies are attenuated may be connected in series to each other within this frequency band.

Hysteresis may be provided for the predetermined driving force F0 and the predetermined vehicle speed V0 in the above embodiment. In this case, the parameter identifier 54 identifies the adjustment parameter if a driving force higher than or equal to a certain higher-side driving force is required by the driver of the hybrid vehicle 1, if the torque instruction is higher than or equal to a certain higher-side torque, or if the vehicle speed is lower than or equal to a certain lower-side vehicle speed. In contrast, the parameter identifier 54 prohibits the identification of the adjustment parameter if a driving force lower than or equal to a certain lower-side driving force is required by the driver of the hybrid vehicle 1, if the torque instruction is lower than or equal to a certain lower-side torque, or if the vehicle speed is higher than or equal to a certain higher-side vehicle speed.

Although the parameter limiter 55 limits the adjustment parameter output from the parameter identifier 54 to a value within a predetermined range in the above embodiment, the operation of the parameter limiter 55 is not limited to the above one. For example, the parameter limiter 55 may update the adjustment parameter with the parameter w(n+1) if the parameter w(n+1) calculated by the parameter identifier 54 by using the above equation (1) has a value within the predetermined range and may prohibit the update of the adjustment parameter with the parameter w(n+1) if the parameter w(n+1) does not have a value within the predetermined range.

Figure 14:
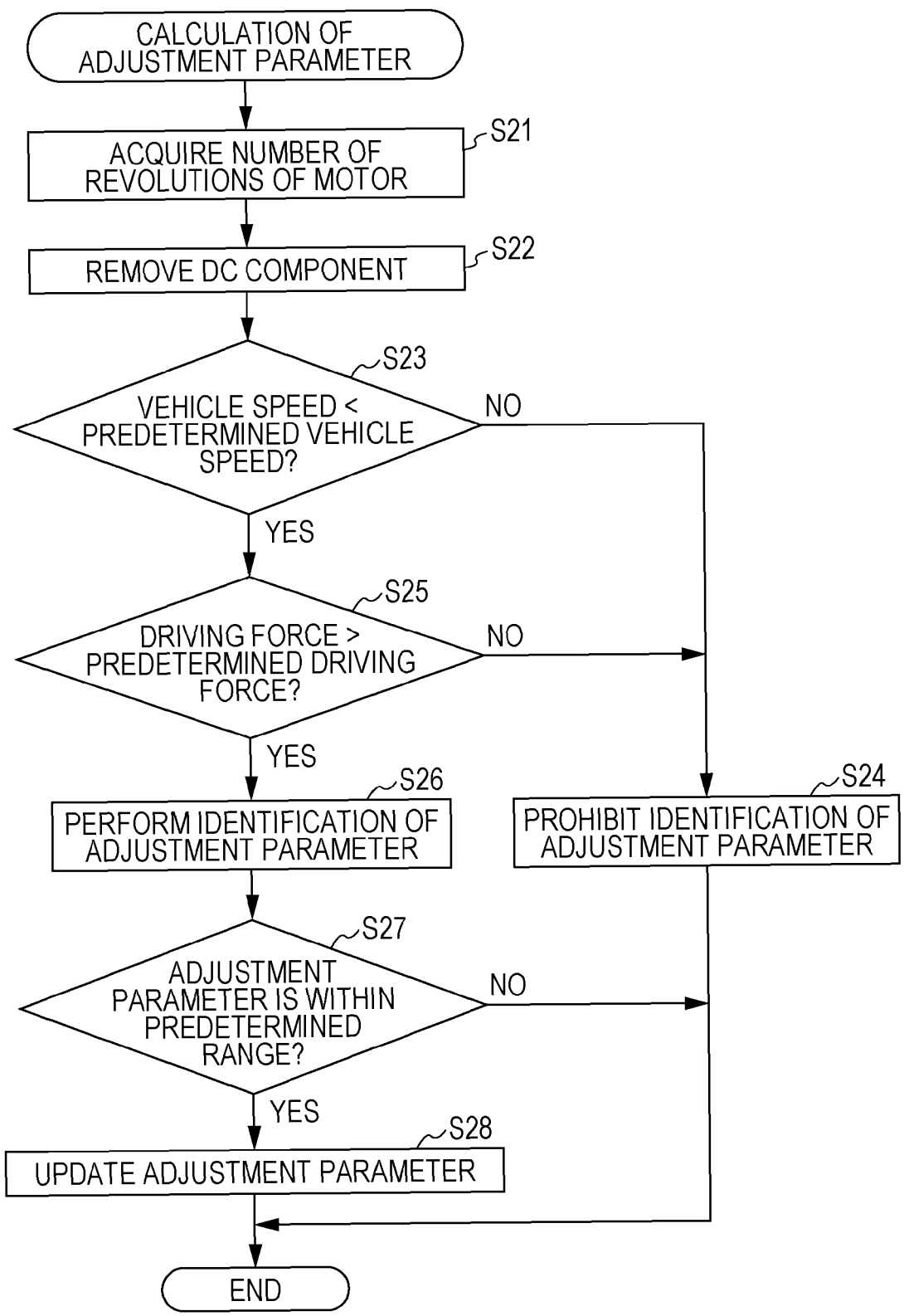
FIG. 14 is a flow chart illustrating an example of a process of calculating the adjustment parameter in the vehicle drive control apparatus according to a modification of the embodiment.

FIG. 14 is a flow chart illustrating an example of a process of calculating the adjustment parameter in a modification of the above embodiment. Referring to FIG. 14, in Step S21, the vehicle drive control system 10 acquires the number of revolutions of the drive motor 11. In Step S22, the vehicle drive control system 10 removes the DC component from the number of revolutions of the drive motor 11 to extract a signal composed of the oscillation component.

In Step S23, the vehicle drive control system 10 determines whether the vehicle speed of the hybrid vehicle 1 is lower than the predetermined vehicle speed V0. If the determination is affirmative (YES in Step S23), the process goes to Step S25. If the determination is negative (NO in Step S23), the process goes to Step S24. In Step S24, the vehicle drive control system 10 prohibits the identification of the adjustment parameter. Then, the process is terminated.

In Step S25, the vehicle drive control system 10 determines whether the driving force of the hybrid vehicle 1 is larger than the predetermined driving force F0. If the determination is affirmative (YES in Step S25), the process goes to Step S26. If the determination is negative (NO in Step S25), the process goes to Step S24 described above.

In Step S26, the vehicle drive control system 10 performs the identification of the adjustment parameter on the basis of the signal composed of the oscillation component extracted from the number of revolutions of the drive motor 11. In Step S27, the vehicle drive control system 10 determines whether the adjustment parameter has a value within a predetermined range. If the determination is negative (NO in Step S27), the process is terminated without updating the adjustment parameter (that is, with the update of the adjustment parameter prohibited). If the determination is affirmative (YES in Step S27), the process goes to Step S28. In Step S28, the vehicle drive control system 10 updates the adjustment parameter. Then, the process is terminated.

While the embodiments are described in terms of some specific examples, it will be clear that these embodiments are not limited to these specific examples.

According to the embodiment, a vehicle drive control apparatus includes a motor (for example, a drive motor 11) configured to generate a running driving force of a vehicle; a number-of-revolutions detecting unit (for example, a number-of-revolutions sensor 33) configured to detect a number of revolutions of the motor to output the result of the detection; an accelerator opening detecting unit (for example, an accelerator opening sensor 31) configured to detect an accelerator opening of the vehicle to output the result of the detection; a speed detecting unit (for example, a vehicle speed sensor 32) configured to detect a speed of the vehicle to output the result of the detection; a torque instruction outputting unit (for example, a torque instruction generating section 41) configured to output a torque instruction for the motor in accordance with a required driving force based on the accelerator opening and the speed; an attenuation filtering unit (for example, a torque instruction notch filter 42 and an adjustment parameter calculating section 43) configured to perform attenuation filtering to the torque instruction so as to attenuate a natural oscillation frequency component of a torque transmission system of the vehicle to output a torque instruction after the attenuation filtering; and a control unit (for example, a power instruction part 25) configured to causes the motor to generate a torque corresponding to the torque instruction after the attenuation filtering. The attenuation filtering unit identifies an attenuation characteristic of the attenuation filtering if the number of revolutions of the motor is smaller than or equal to a predetermined number of revolutions and the torque of the motor is higher than or equal to a predetermined torque.

With the vehicle drive control apparatus according to the embodiment, since the attenuation characteristic of the attenuation filtering is identified only when the number of revolutions of the motor is lower than or equal to a predetermined number of revolutions and the torque thereof is higher than or equal to a predetermined torque in a state in which the natural resonance of the torque transmission system is likely to be induced, it is possible to rapidly identify an appropriate attenuation characteristic. As a result, even if the natural oscillation frequency of the torque transmission system is varied due to, for example, the aging of the vehicle, the attenuation characteristic of the attenuation filtering unit can be caused to appropriately follow the variation to suppress the mechanical resonance of the vehicle. Accordingly, it is possible to drive the motor without providing a feeling of discomfort to occupants of the vehicle.

The attenuation filtering unit may include an extracting unit (for example, a DC component removal filter 51, a difference calculator 52, and an identification notch filter 53) that extracts an oscillation frequency component having the same oscillation frequency as that of the natural oscillation frequency component of the torque transmission system from the number of revolutions; and an adaptive filtering unit (for example, a parameter identifier 54) that calculates a filter factor used for adjusting the attenuation characteristic by adaptive processing to minimize the oscillation frequency component.

In the above configuration, the natural oscillation frequency component attenuated in the torque instruction has the same oscillation frequency as that of the oscillation frequency component of the variation in the number of revolutions due to the variation in the torque. Accordingly, the adjustment of the attenuation characteristic of the attenuation filtering to the torque instruction by using the filter factor calculated in adaptive processing based on the variation in the number of revolutions allows the natural oscillation frequency component inducing the mechanical resonance to be appropriately attenuated from the torque instruction to suppress the mechanical resonance of the vehicle.

The attenuation filtering unit may further include a limiting unit (for example, a parameter limiter 55) that limits the filter factor to a value within a predetermined range corresponding to a desired oscillation frequency band of the torque transmission system.

With the above configuration, the frequency band to be attenuated in the attenuation filtering can be set in consideration of, for example, the individual difference of the vehicle in advance and a predetermined range of the filter factors corresponding to this frequency band can be set as the limited range to, for example, prevent the frequency that is attenuated from being inappropriately shifted in the attenuation filtering and prevent inappropriate divergence from occurring in the attenuation filtering.

The attenuation filtering unit preferably starts the identification of the attenuation characteristic if the running driving force higher than or equal to a certain higher-side driving force is required by a driver of the vehicle, if the torque instruction is higher than or equal to a certain higher-side torque, or if the vehicle speed is lower than or equal to a certain lower-side vehicle speed and preferably stops the identification of the attenuation characteristic if the running driving force lower than or equal to a certain lower-side driving force is required by the driver of the vehicle, if the torque instruction is lower than or equal to a certain lower-side torque, or if the vehicle speed is higher than or equal to a certain higher-side vehicle speed.

With the above configuration, even if brake operations and/or accelerator operations that are close to the natural oscillation frequency of the torque transmission system are performed in a state in which the resonance of the torque transmission system does not significantly appear normally when the number of revolutions of the motor is largely varied, for example, as in rapid slip, rapid deceleration, or pumping brake, the stop of the identification of the attenuation characteristic prevents the attenuation characteristic from being inappropriately set so as to attenuate the frequency components of such operations.

The attenuation filtering unit may include a single notch filter (for example, a torque instruction notch filter 42) or a plurality of notch filters (for example, multiple torque instruction notch filters 42) that are cascaded to each other.

With the above configuration, the identification of the attenuation characteristics occurring at certain frequencies can be stopped when the attenuation filtering unit includes a single notch filter, and a frequency band from a certain lower limit frequency to a certain upper limit frequency can be set as an attenuation target area and the identification of the attenuation characteristics occurring at different appropriate frequencies within this frequency band can be stopped when the attenuation filtering unit includes a plurality of single notch filters cascaded to each other. Accordingly, it is possible to prevent the frequency that is attenuated from being inappropriately shifted in the attenuation filtering and to prevent inappropriate divergence from occurring in the attenuation filtering.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle drive control system comprising:
   a motor configured to generate a running driving force of a vehicle;
   a rotational speed detector configured to detect rotational speed of the motor;
   an accelerator opening degree detector configured to detect an opening degree of an accelerator of the vehicle;
   a vehicle speed detector configured to detect a speed of the vehicle;
   a torque instruction outputting device configured to output a torque instruction for the motor in accordance with a required driving force based on the accelerator opening degree detected by the accelerator opening degree detector and the vehicle speed detected by the vehicle speed detector;
   an attenuation filtering device configured to perform attenuation filtering to the torque instruction to attenuate a natural oscillation frequency component of a torque transmission system of the vehicle and configured to output a filtered torque instruction after the attenuation filtering, the attenuation filtering device being configured to identify an attenuation characteristic of the attenuation filtering if the motor is in a first state in which the rotational speed of the motor is smaller than or equal to a predetermined rotational speed and in which the torque of the motor is higher than or equal to a predetermined torque, the first state comprising a state in which natural resonance of the torque transmission system is likely to be induced; and a controller configured to cause the motor to generate a torque corresponding to the filtered torque instruction.

2. The vehicle drive control system according to claim 1, wherein the attenuation filtering device includes
an extracting device configured to extract an oscillation frequency component having a substantially same oscillation frequency as an oscillation frequency of the natural oscillation frequency component of the torque transmission system from the rotational speed detected by the rotational speed detector, and
an adaptive filtering device configured to calculate a filter factor used for adjusting the attenuation characteristic, by adaptive processing to minimize the oscillation frequency component extracted by the extracting device.

3. The vehicle drive control system according to claim 2, wherein the attenuation filtering device further includes
a limiting device configured to limit the filter factor to a value within a predetermined range corresponding to a certain oscillation frequency band of the torque transmission system.

4. The vehicle drive control system according to claim 3, wherein the attenuation filtering device further includes
a DC component removal filter configured to remove a DC component from a detection signal indicating the rotational speed detected by the rotational speed detector.

5. The vehicle drive control system according to claim 4, wherein the attenuation filtering device further includes
a difference calculator configured to subtract the oscillation frequency component extracted by the extracting device from an output of the DC component removal filter.

6. The vehicle drive control system according to claim 5, wherein the adaptive filtering device is configured to calculate the filter factor based on a difference calculated by the difference calculator.

7. The vehicle drive control system according to claim 1, wherein the attenuation filtering device is configured to start identifying the attenuation characteristic if the running driving force higher than or equal to a certain higher-side driving force is required by a driver of the vehicle, if the torque instruction is higher than or equal to a certain higher-side torque, or if the vehicle speed is lower than or equal to a certain lower-side vehicle speed, and
wherein the attenuation filtering device is configured to stop identifying the attenuation characteristic if the running driving force lower than or equal to a certain lower-side driving force is required by the driver of the vehicle, if the torque instruction is lower than or equal to a certain lower-side torque, or if the vehicle speed is higher than or equal to a certain higher-side vehicle speed.

8. The vehicle drive control system according to claim 1, wherein the attenuation filtering device includes a single notch filter or a plurality of notch filters configured to be cascaded to each other.

9. A vehicle drive control system comprising:
generating means for generating a running driving force of a vehicle;
rotational speed detecting means for detecting rotational speed of the generating means;
accelerator opening degree detecting means for detecting an opening degree of an accelerator of the vehicle;
vehicle speed detecting means for detecting a speed of the vehicle;
torque instruction outputting means for outputting a torque instruction for the generating means in accordance with a required driving force based on the accelerator opening degree detected by the accelerator opening degree detecting means and the vehicle speed detected by the vehicle speed detecting means;
attenuation filtering means for performing attenuation filtering to the torque instruction to attenuate a natural oscillation frequency component of a torque transmission system of the vehicle and for outputting a filtered torque instruction after the attenuation filtering, the attenuation filtering means being for identifying an attenuation characteristic of the attenuation filtering if the generating means is in a first state in which the rotational speed of the generating means is smaller than or equal to a predetermined rotational speed and in which the torque of the generating means is higher than or equal to a predetermined torque, the first state comprising a state in which natural resonance of the torque transmission system is likely to be induced; and
controlling means for causing the generating means to generate a torque corresponding to the filtered torque instruction.

* * * * *